United States Patent Office 3,096,525
Patented July 9, 1963

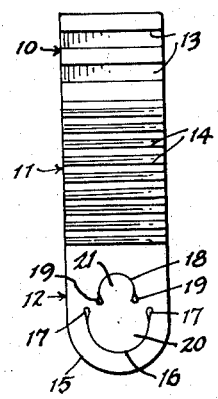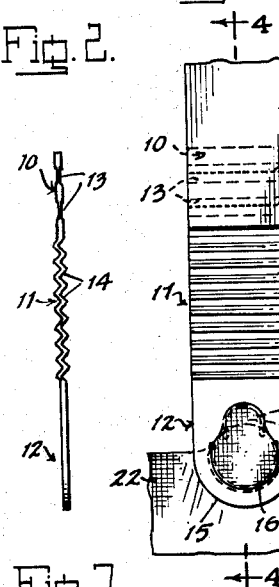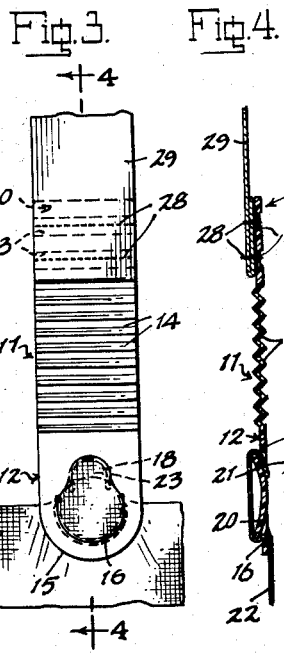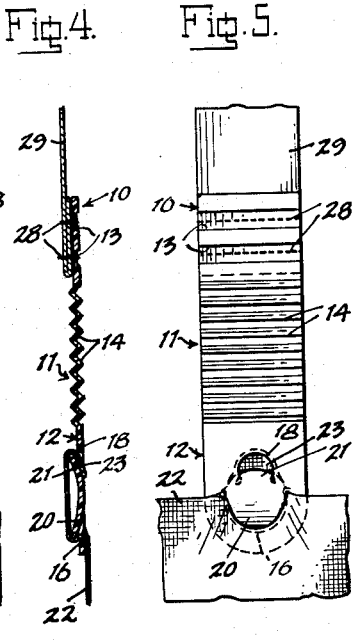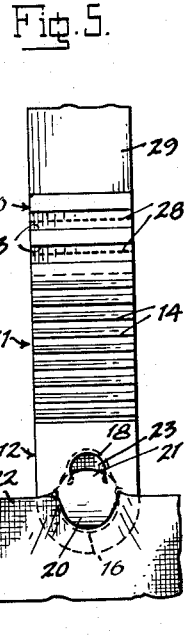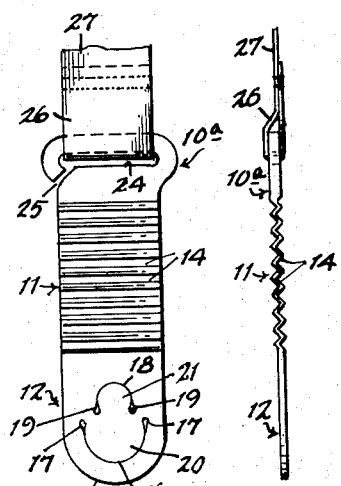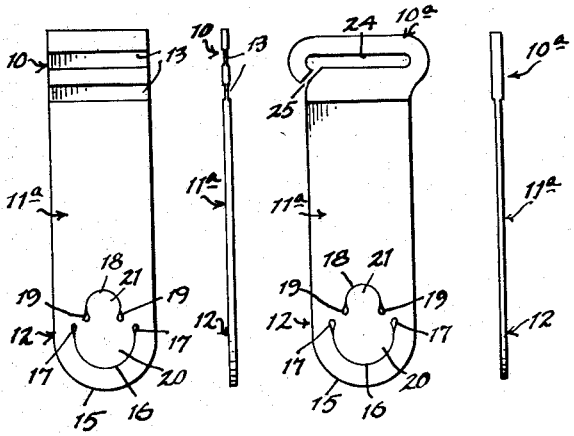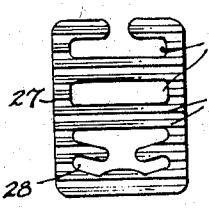

3,096,525
GARMENT FASTENER
Charna Gould, 280 Badger Ave., Millburn, N.J.
Filed Mar. 11, 1960, Ser. No. 14,292
2 Claims. (Cl. 2—335)

The present invention relates to a garment fastener and has for an object to provide a fastener formed of plastic material. While the invention may be incorporated in various types of fasteners to provide a connection between parts of a garment or between separate garments, it is particularly directed to a fastener of the hose supporter type, and has for an object to provide a one-piece fastener having integral means for detachably connecting a garment hereto, and which provides a relatively flat fastening, as distinguished from the conventional type of hose supporter employing a projecting button mounted upon a flexible tape and cooperating with a wire loop. A further object is to provide a one-piece plastic fastener which through extrusion, injection molding, or other suitable plastic forming methods, may have various portions thereof produced in suitable thicknesses and cross-sectional shapes best suited to the particular functions of such portions. A further object is to provide a fastener formed of plastic material having elastic memory and where transverse corrugations are provided therein to impart longitudinal elasticity to the fastener.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a front elevation of a fastener according to the invention;

FIG. 2 is a side elevation;

FIG. 3 is a front elevation showing the fastener secured to a supporting tape at one end and to a stocking top at the other end;

FIG. 4 is a vertical sectional view taken along the line of 4—4 of FIG. 3;

FIG. 5 is a rear elevation of the fastener as seen in FIG. 3;

FIG. 6 is a front elevation of a fastener according to a modified form of the invention and showing the loop end of a supporting tape detachably connected thereto;

FIG. 7 is a side elevation of the fastener as seen in FIG. 6;

FIG. 8 is a front elevation of a modification of the form of the invention shown in FIGS. 1-5;

FIG. 9 is a side elevation thereof;

FIG. 10 is a front elevation of a modification of the form of the invention shown in FIGS. 6 and 7;

FIG. 11 is a side elevation thereof;

FIG. 12 is a front elevation of a buckle type fastener according to the invention;

FIG. 13 is a side elevation thereof.

Referring to the drawings and more particularly to FIGS. 1-5, the fastener according to the embodiment of the invention illustrated therein comprises a one-piece plastic member in the form of an elongated generally flat strip having an upper end portion 10 for connection to a supporting part of a garment or the like, an intermediate flexible and elastic portion 11, and a lower fastening portion 12 for detachable connection to a supported part of a garment, as for instance a stocking top. The plastic material may be of any suitable type, for instance polypropylene, polyethylene, Delran (acetal resin), nylon, etc., which has the characteristic of being flexible while maintaining a desired degree of stiffness, and which has elastic memory, that is, the ability when bent to recover to its original form. Preferably it should also be semi-hard to provide a smooth soft-to-the-touch surface.

The upper end portion 10 is provided with a plurality of transversely extending bands 13 of reduced thickness for the purpose of effectually receiving machine stitching 28, as seen in FIGS. 3-5, for securing a supporting tape 29 or the like to the fastener. This supporting tape may for instance be the conventional hose supporter tape secured to the lower end of a girdle or the like.

The intermediate portion 11 is rendered longitudinally elastic, and of greater flexibility longitudinally than transversely, by a series of transverse corrugations 14, the elastic memory of the plastic material being such that when longitudinal pull is exerted to extend the corrugated portion the corrugations are under tension and exert a retractive force tending to return the corrugated portion to its original form. The corrugations thus provide a spring-like structure giving longitudinal stretch and elasticty to the fastener, while at the same time the end portions 10 and 12 are in themselves substantially non-stretchable. It is pointed out that while the three parts of the fastener are integrally formed of the same material, the longitudinal stretch and elasticity of the fastener is a function of the corrugated form of the intermediate portion 11 in association with the elastic memory characteristic of the plastic material, as distinguished for instance from a longitudinally elastic fastener formed of inherently elastic material such as rubber.

The lower fastener portion 12 is preferably rounded at its lower edge 15 and is provided with a U-shaped slit 16, preferably curved in concentric relation to the rounded edge 15 and preferably having the ends of the slit widened into substantially tear-drop shaped apertures 17 for the purpose of providing smooth edged clearance spaces for receiving the edge of the stocking top or the like, as will presently more fully appear. Opposed to and upwardly spaced from the U-shaped slit 16 there is provided an inverted U-shaped slit 18 of substantially smaller dimensions than the slit 16, and also provided with tear-drop shaped clearance apertures 19 at its ends. The slit 16 provides a downwardly directed tab 20 and the slit 18 provides an upwardly directed relatively smaller tab 21 both of which normally lie in the plane of the lower fastener portion 12.

As seen in FIGS. 3-5 the stocking top 22 is connected to the fastener end 12 by first pressing it forwardly through the slit 16 to the forward side of the tab 20, the latter being flexed forwardly to permit this. Thereupon a folded over marginal portion 23 is hooked over the tab 21 which is flexed forwardly by pressing it from the rear. Through elastic memory the tabs 20 and 21 tend to move back into the plane of the fastener portion 12 and thus wedge the stocking material into the slits 16 and 18. As seen in FIG. 4, the material is disposed in a downward curve around the upper edge of the slit 16, i.e the edge of the tab 20, and in an upward curve around the lower edge of the slit 16, so that it is retained in the slit 16 by a combined snubbing and wedging action. At the same time the folded over marginal portion 23 of the material in its hooked relation over the tab 21 provides a snubbing action which combines with the wedging action of the tab 21 to retain the material in the slit 18.

It will be noted from the profile shape of the fastener as clearly shown in FIG. 2 that the structure lends itself to efficient production by extrusion methods, the corrugations 14 and the bands 13 extending in parallel relation transversely across the fastener. Thus a plastic extrusion having the cross-sectional shape as shown in FIG. 2 may be produced in any suitable length, the individual fasteners being thereupon stamped therefrom by suitable dies which produce the outline shape as well as the slits 16 and 18. In the process of extrusion any desired thickness of the various portions of the fastener may be produced, it being noted that in the illustrated example the bands 13 are relatively thin as compared to the rest of the fastener, and that the intermediate corrugated portion 11 is relatively thinner than the fastener portion 12.

In FIGS. 6 and 7 there is shown a modification in which the upper end portion 10a of the fastener is provided with a transverse slot 24 having an entrance opening 25 at one end, and in which the looped end 26 of a supporting tape 27 is engaged. In order to give increased rigidity to the upper end portion 10a it is substantially thicker than the remainder of the fastener, and terminates at its junction with the intermediate corrugated portion 14 in a straight line shoulder, extending transversely across the strip to the side edges thereof, and constituting the demarcation line between said upper end portion and said intermediate corrugated portion, as clearly shown in FIG. 7. This type of connection permits the previously formed loop 26 of the tape to be readily engaged or disengaged with the fastener. If desired the entrance opening 25 may be omitted to provide a closed slot in which case the loop 26 of the tape would be secured after being passed through the slot 24.

In FIGS. 8–11 there are shown modifications of the invention in which the intermediate portion 11a is not corrugated, so that the fastener does not have longitudinal elasticity. In the modification, FIGS. 8 and 9, the upper end portion 10 corresponds to the upper end portion 10 of the form of the invention shown in FIGS. 1–5, and in the modification, FIGS. 10 and 11, the upper end portion 10a corresponds to the upper end portion 10a of the form of the invention shown in FIGS. 6 and 7.

In FIGS. 12 and 13 the invention is embodied in a buckle type fastener such as employed for the adjustable connection of the shoulder straps of brassieres or the like. In this case the plastic strip 27 is provided with transverse corrugations 14 throughout its length and suitable formations such as slots 28 are provided therein for the connection of the ends of the shoulder strap to the fastener in well known manner. The transverse corrugations impart longitudinal stretch and elasticity to the fastener in substantially similar manner to the other embodiments.

What is claimed is:
1. A one-piece garment fastener comprising a flexible strip formed of plastic material having elastic memory and including an intermediate portion and upper and lower end portions integral with said intermediate portion, said upper end portion being relatively thick transversely across the strip to the side edges thereof, and said intermediate portion being relatively thin transversely across the strip to the side edges thereof, with a straight line shoulder extending transversely across the strip to the side edges thereof and constituting the demarcation line between said upper end portion and said intermediate portion, said upper end portion being relatively less flexible than said intermediate portion and having slot means for receiving the loop of a supporting tape, and connection means at said lower end portion for connection to a garment to be supported by said fastener comprising a substantially U-shaped slot defining a downwardly directed tab and an inverted substantially U-shaped slot upwardly opposed to said first slot and defining an upwardly directed tab.

2. A one-piece garment fastener comprising a flexible strip formed of plastic material having elastic memory and including an intermediate portion and upper and lower end portions integral with said intermediate portion, said upper end portion being adapted for connection to a supporting tape, and connection means at said lower end portion for connection to a garment to be supported by said fastener comprising a substantially U-shaped slot defining a downwardly directed tab and an inverted substantially U-shaped slot upwardly opposed to said first slot and defining an upwardly directed tab.

References Cited in the file of this patent

UNITED STATES PATENTS

| | | |
|---|---|---|
| 1,328,931 | Stevens | Jan. 27, 1920 |
| 1,470,631 | Marion | Oct. 16, 1923 |
| 1,513,522 | Ross | Oct. 28, 1924 |
| 1,733,020 | Jones | Oct. 22, 1929 |
| 2,288,313 | Buchshaum et al. | June 30, 1942 |
| 2,627,639 | Eilertsen | Feb. 10, 1953 |
| 2,655,664 | Ramos | Oct. 20, 1953 |
| 2,849,723 | Marino | Sept. 2, 1958 |